(12) United States Patent
Monin et al.

(10) Patent No.: US 6,304,564 B1
(45) Date of Patent: Oct. 16, 2001

(54) METHOD FOR TRANSMITTING MESSAGES IN WIRELESS COMMUNICATION SYSTEM USING A SERVER PROCESS

(75) Inventors: Jeffrey Monin, North Caldwell; Manoj Sindhwani, Matawan, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/758,440

(22) Filed: Nov. 29, 1996

(51) Int. Cl.[7] ................................................ H04L 12/66
(52) U.S. Cl. ................................... 370/338; 370/469
(58) Field of Search ................................. 370/338, 401, 370/466, 473, 474, 469, 340, 471, 328, 400, 402

(56) References Cited

U.S. PATENT DOCUMENTS 5,446,736 * 8/1995 Gleeson et al. ................ 370/85.13
5,636,371 * 6/1997 Yu ..................................... 395/500

OTHER PUBLICATIONS

Black; Osi, A Model for Computer Communications Standards (Prentice Hall 1991 p. 286).*

* cited by examiner

Primary Examiner—Douglas Olms
Assistant Examiner—Ken Vanderpuye

(57) ABSTRACT

The present invention discloses a method for transmitting messages to components in a wireless communication system using a server process. In an embodiment of the present invention, the wireless communication system is a set of interconnected nodes with a main circuit board connected to zero or more components. To transmit a message to a component in the wireless communication system, the message is first encapsulated with a reference label that is associated with a component to which the message is to be sent, i.e., destination component. Upon encapsulation, the message is then transmitted to a destination node, which is a node on which resides the destination component. At the destination node, a server process determines an address for the destination component using the reference label. In one embodiment of the present invention, the address of the destination component is determined by the server process using a mapping table containing information correlating reference labels to addresses of components in the destination node.

21 Claims, 5 Drawing Sheets

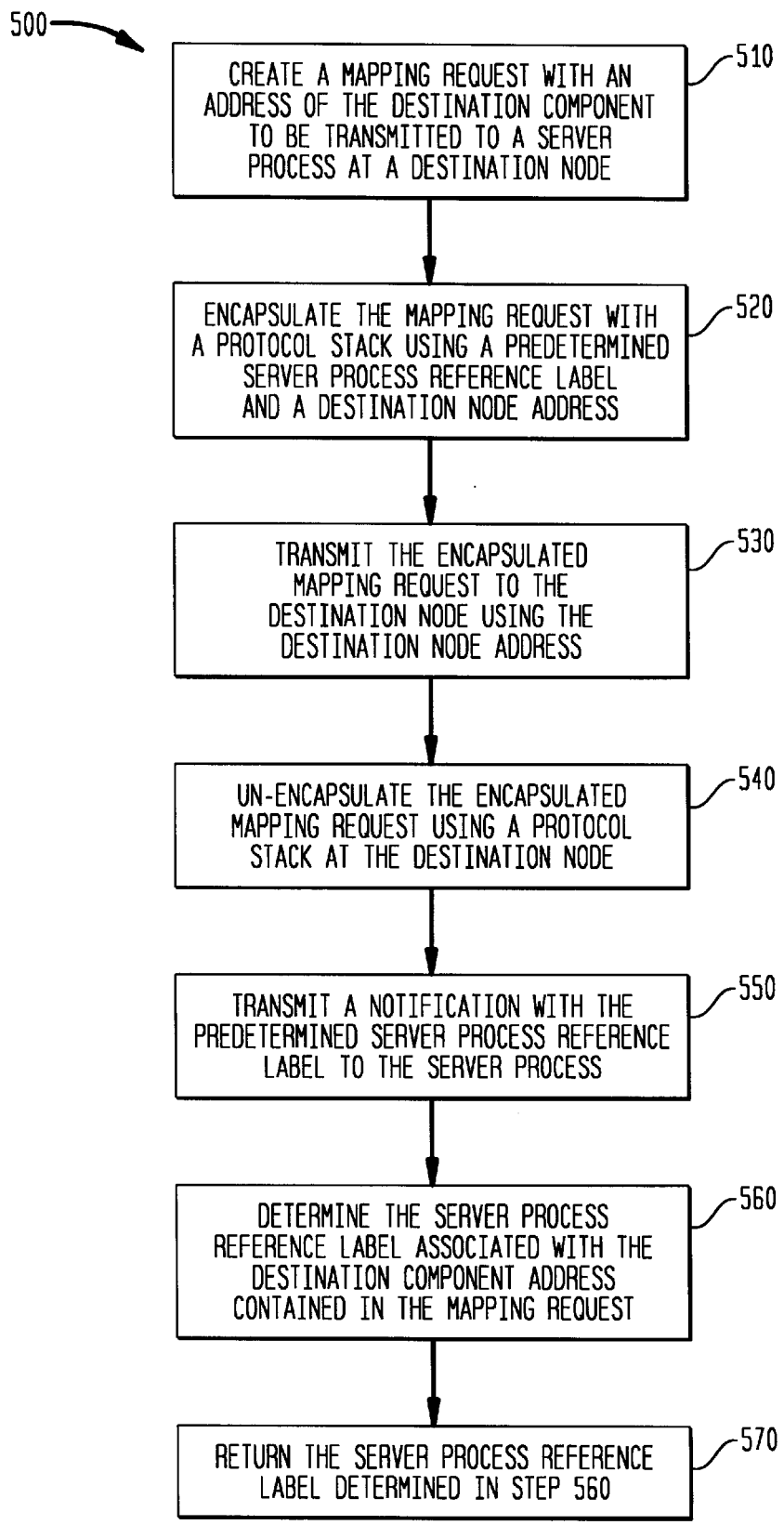

METHOD FOR TRANSMITTING MESSAGES IN WIRELESS COMMUNICATION SYSTEM USING A SERVER PROCESS

FIELD OF THE INVENTION

The present invention relates generally to telecommunication systems and, in particular, to wireless communication systems utilizing data communication concepts.

BACKGROUND OF THE INVENTION

Data communication concepts, such as protocol stacks, are increasingly being used to achieve communication across wireless communication systems. However, data communications concepts were developed to achieve communication across computer networks, such as local area networks (LAN), wide area networks (WAN), etc., which is different than achieving communication across wireless communication systems. In computer networks, data communication involves encapsulating data with a first protocol stack at a source host computer such that the data may be transmitted to a main circuit board (or a networking hardware device, such as the well-known Ethernet card, from which the data can be retrieved into the main circuit board) in a destination host computer where the encapsulated data is un-encapsulated with a second protocol stack and routed to a software process on the main circuit board. To transmit the data to a software process on the main circuit board, some control information regarding the software process to which the data is to be sent is required. The first protocol stack adds such control information to the data in the encapsulation process. Specifically, the control information being added includes a port number, which is an indication of the software process on the main circuit board in the destination host computer to which the data belongs (or is to be sent).

By contrast, in wireless communication systems, data communication involves encapsulating data with a first protocol stack at a source node and transmitting the encapsulated data to a main circuit board in a destination node where the encapsulated data is un-encapsulated with a second protocol stack and routed to a software process on a component connected to the main circuit board via an external bus. Thus, unlike computer networks, data communication in wireless communication systems involves routing the data to a software process that is not on the main circuit board. To route the data from the main circuit board to a software process on a component, the address of the component is required.

Since data communication concepts were developed for computer networks, typical industry standard protocol stacks, such as the well-known Transmission Control Protocol/Internet Protocol (TCP/IP) suite, assumed all data were to be transmitted to a software process on a main circuit board and, thus, were not developed to add sufficient control information that could address a component. A simple solution would be to redevelop the protocol stack such that the protocol stack can add such sufficient control information. However, such a solution is undesirable because it would require customization of an industry standard which is currently being used in many wireless communication systems. Accordingly, there exist a need to add sufficient control information that could address a component using typical industry standard protocol stacks which would allow data to be transmitted to a component in a wireless communication system.

SUMMARY OF THE INVENTION

The present invention discloses a method for transmitting data encapsulated with a protocol stack to a software process on a component in a wireless communication system using a server process. Specifically, the server process uses control information added by the protocol stack to determine a component address for routing the data to the appropriate component in the wireless communication system, wherein the control information includes sufficient information to address a component.

In an embodiment of the present invention, the wireless communication system is a set of interconnected nodes with a main circuit board connected to zero or more components via an external bus. To transmit a message to a component in the wireless communication system, the message is first encapsulated using a protocol stack. The encapsulated message includes an indication of a destination node, which is a node containing the destination component, and a server process reference label that is associated with the component to which the message is to be sent. Upon encapsulation, the encapsulated message is then transmitted to a main circuit board in the destination node using the indication of the destination node. The encapsulated message is subsequently un-encapsulated using another protocol stack at the destination node and routed from the main circuit board to the component by a server process using the server process reference label.

BRIEF DESCRIPTION OF THE DRAWINGS

The features, aspects, and advantages of the present invention will become better understood with regard to the following description, appended claims, and accompanying drawings where:

FIG. 5 depicts an exemplary flowchart illustrating the sequence of steps in determining a server process reference label associated with a destination component address in accordance with one embodiment of the present invention.

DETAILED DESCRIPTION

Figure 1:
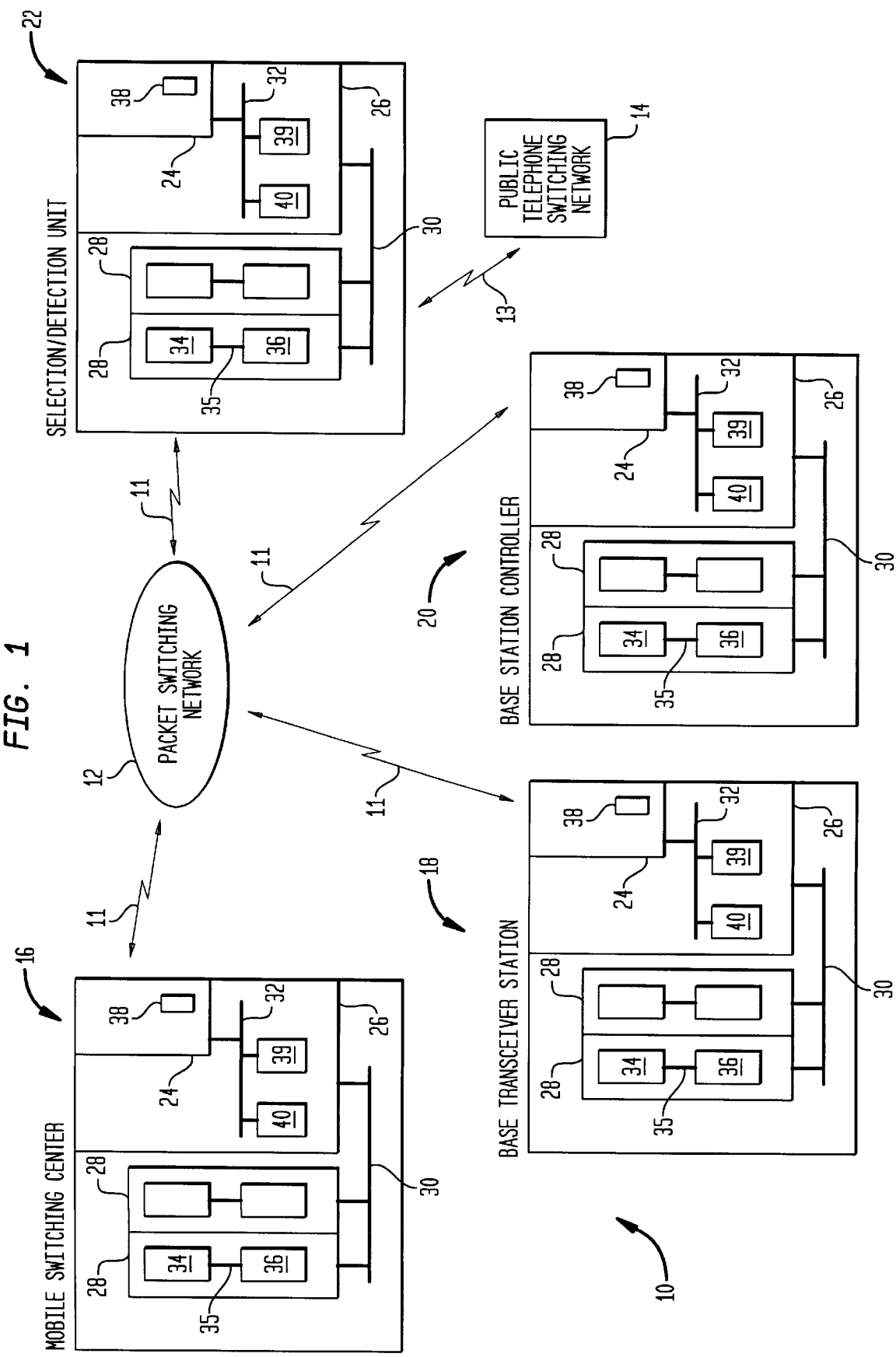
FIG. 1 depicts an exemplary example of a packet switched wireless communication system in accordance with one embodiment of the present invention.

Referring to FIG. 1, there is illustrated an exemplary example of a wireless communication system 10 utilizing a packet switching network. As shown in FIG. 1, the wireless communication system 10 comprises a packet switching network 12, nodes 16, 18, 20, 22. The packet switching network 12 is a system for transferring data from one node to another node in the wireless communication system 10, and comprises a set of interconnected packet switches, which are devices for switching data from node-to-node using control information added to the data. In one embodiment of the present invention, the packet switching network is the well-known Asynchronous Transfer Mode (ATM) network, which is fully described in "ATM: Foundation for Broadband Networks" by Uyless Black, published in 1995 by Prentice-Hall, Inc. and "ATM Networks Second Edition"

by Rainer Handel, Manfred N. Huber and Stefan Schroder, published in 1994 by Addison-Wesley Publishing Company. As used in this application, the term data shall be construed to include, but is not limited to, information representing data, voice and/or video.

Each of the nodes 16, 18, 20, 22 are embedded systems for performing one or more data communication functions. In one embodiment of the present invention, node 16 is a Mobile Switching Center (MSC) for coordinating the setting-up of calls to and from radiotelephones, not shown, node 18 is a Base Transceiver Station (BTS) for transmitting and receiving radio signals, node 20 is a Base Station Controller (BSC) for controlling radio resources at the BTS, and node 22 is a Selection/Detection Units (SDU) for interfacing the wireless communication system 10 to a Public Telephone Switching Network (PTSN) 14, which is a wired communication system. The SDU is coupled to the PTSN 14 by a connection 13.

Each node 16, 18, 20, 22 includes a main circuit board 26 and zero or more components 28. The main circuit board 26 is a hardware device with a packet switching circuit 24, a central processing unit (CPU) 39 and a main computer memory 40. The packet switching circuit 24 is a device for interfacing and connecting the node to the packet switching network 12 via a connection 11, and includes a computer memory 38 for storing data; the CPU 39 is a device for performing logic, computational and decision-making functions for the node; and the main computer memory 40 is a device accessible by the CPU 39 for storing information or instructions which may be executed by the CPU 39, i.e., software processes. The packet switching circuit 24, CPU 39 and main computer memory 40 are inter-connected via an internal bus 32. In another embodiment of the present invention, the packet switching circuit 24 is on a circuit board separate from, but connected to, the main circuit board 26. For the purposes of this application, the term process shall be construed to include, but is not limited to, software processes, tasks and threads.

Components 28 are hardware devices connected to the main circuit board 26 via an external bus 30. Components include, but are not limited to, channel elements and frame selectors, wherein channel elements are hardware devices in the BTS for communicating with radiotelephones and frame selectors are hardware devices in the SDU for communicating with the channel elements and interfacing the channel element to the PTSN 14. Each component 28 usually includes a processor or ASIC (application specific integrated circuit) 34 connected via an internal bus 35 to a computer memory 36. Residing on the computer memory 36 of each component 28 is a component process, which is a software process for acting upon data in the form of messages placed within the computer memory 36 of the component 28 and/or creating messages to be transmitted to other components in the same or different wireless communication systems. Components to which messages may be sent are referred to herein as "addressable components." All components are hereinafter deemed addressable components unless otherwise indicated.

Figure 2:
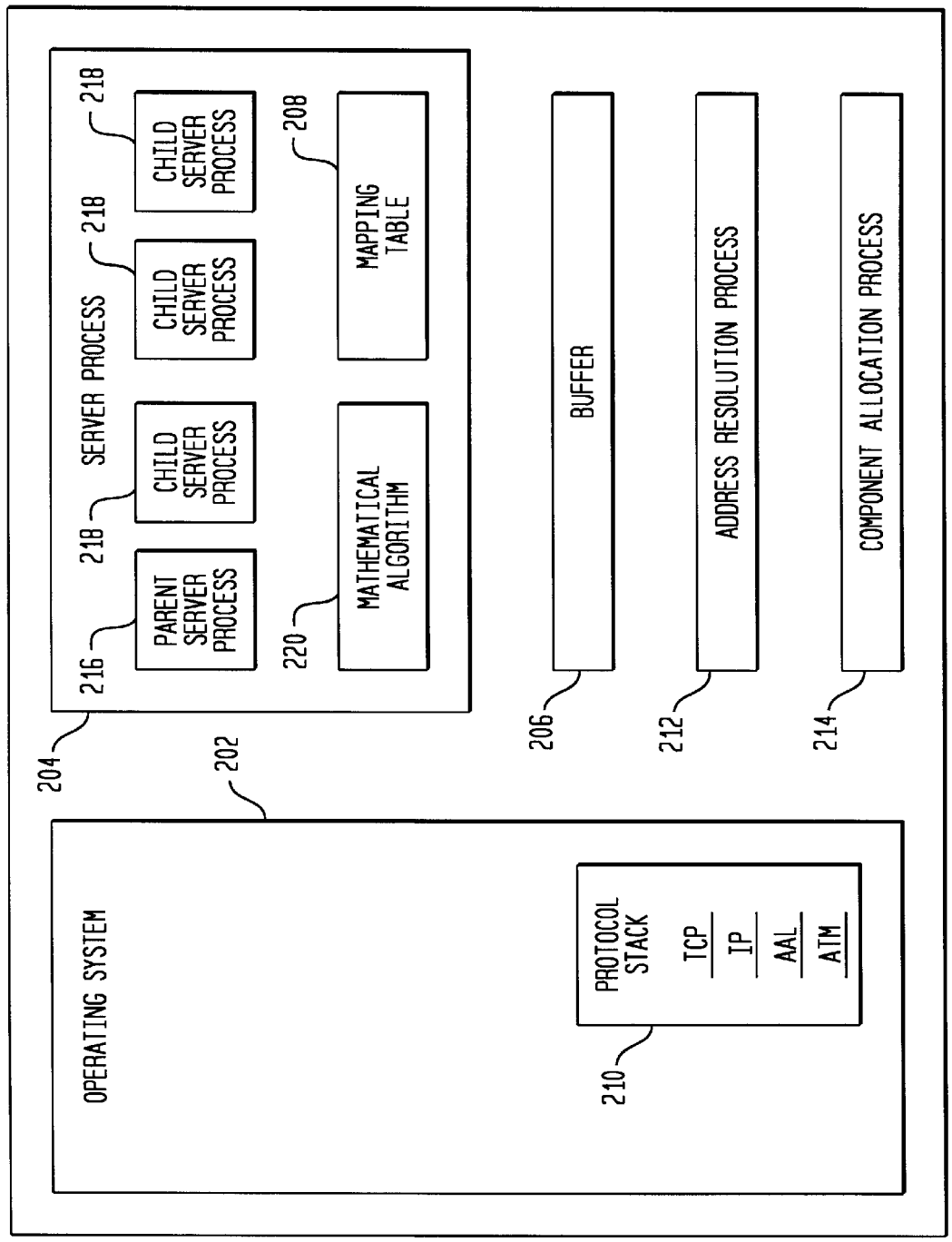
FIG. 2 depicts a functional block diagram of a computer memory on a main circuit board of the packet switched wireless communication system of FIG. 1.

Residing on the main computer memory 40 are one or more software processes and an operating system for handling and routing incoming messages to the appropriate components 28, i.e., destination components. Referring to FIG. 2, there is shown a functional block diagram of the main computer memory 40. As shown in FIG. 2, residing on the main computer memory 40 is a server process 204, an operating system 202, and one or more buffers 206 for storing data, an address resolution process 212, and a component allocation process 214.

The server process 204 is a collection of one or more software process, and includes a parent server process 216 and zero or more child server processes 218. The parent server process is a software process operable to listen to incoming connection requests, accept connections, and create child server processes. The child server process is a software process operable to take over a connection from the parent server process that created the child server process, translate reference labels to addresses which are indicative of component locations, i.e., component addresses, and route messages to components 28 over the external bus 30 using device drivers, system calls, application program interfaces (API) or a combination of the aforementioned, wherein reference labels identify connections between a protocol stack and specific software processes, e.g., child server processes—that is, reference labels are identifiers for associating messages as belonging to specific software processes. See "UNIX Network Programming" by W. Richard Stevens, published in 1990 by Prentice-Hall, Inc. Reference labels, component addresses and protocol stacks will be further described herein.

The operating system 202 is software that manages hardware and software resources on the main circuit board 26. The operating system 202 includes a protocol stack 210 and functions for providing services to drivers, I/O modules, etc. The protocol stack 210 is a software process with a layered set of rules for achieving communication across a network, wherein each layer corresponds to a different set of rules for achieving different facets of communication. The operating system 202 uses the protocol stack 210 to encapsulate (and segment) messages for transmission, un-encapsulate (and re-assemble) messages that were encapsulated (and segmented), and determine to which software processes the messages belong using the reference labels. In one embodiment of the present invention, the protocol stack 210 includes a Transmission Control Protocol (TCP) layer, an Internet Protocol (IP) layer, an ATM Adaptation layer (AAL), and an ATM layer. The TCP and IP layers are filly described in "TCP/IP Illustrated, Volume I" by W. Richard Stevens, published in 1994 by Addison-Wesley Publishing Company. The AAL and ATM layers are fully described in "ATM and Cell Relay Service for Corporate Environments" by Daniel Minoli and Michael Vitella, published in 1994 by McGrawHill, Inc., and in "ATM: Foundation for Broadband Networks," supra.

Messages are encapsulated for transmission by a protocol stack in accordance with an addressing scheme. The addressing scheme dictates the manner in which to address a wireless communication system or parts thereof, e.g., a node or a component. To address a node or a component, a node address or a component address is required, respectively, wherein the node address indicates the location of the node and the component address indicates the location of the component. One embodiment of the present invention utilizes a hierarchical addressing scheme for addressing wireless communication systems, nodes and components. Specifically, in this hierarchical addressing scheme, each wireless communication system has a unique identifier, each node has a unique identifier within the wireless communication system it belongs, and each component has a unique identifier within the node it resides. In this embodiment, the node address comprises a wireless communication system identifier and a node identifier, and the component address comprises a component identifier. Thus, to send a message to a component at another node, both the node address and the component address are required.

Figure 3:
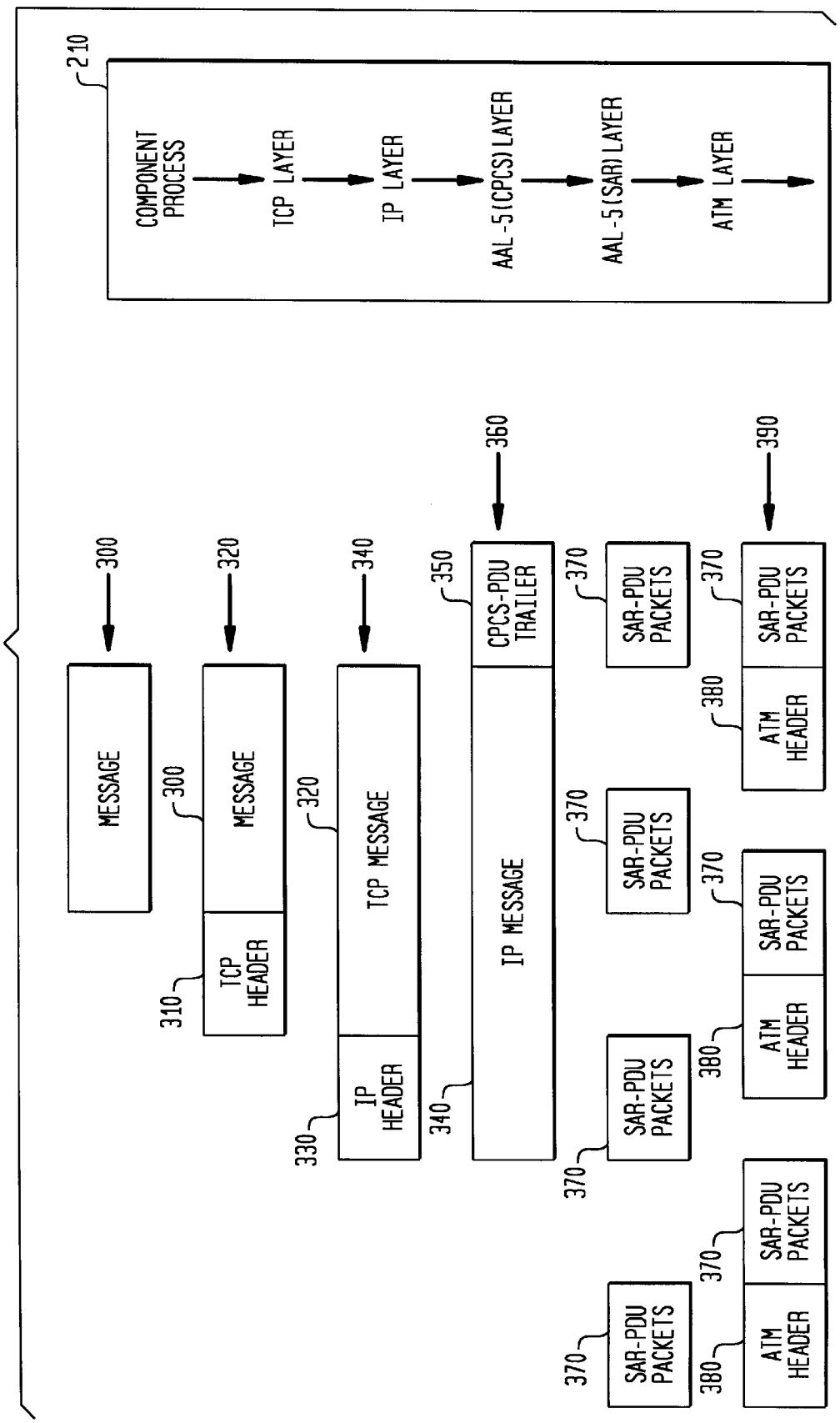
FIG. 3 depicts an exemplary illustration of a message being encapsulated in accordance with a hierarchical addressing scheme and a protocol stack having a TCP layer, an IP layer, an AAL-5, and an ATM layer.

Referring to FIG. 3, there is shown an exemplary illustration of a message being encapsulated by the protocol stack 210 of FIG. 2 in accordance with the aforementioned hierarchical addressing scheme. As shown in FIG. 3, a message 300 created by a component process (or another software process) is encapsulated as it travels down the protocol stack 210. In the TCP layer, control information in the form of a TCP header 310 is added to the message 300 to create a TCP message 320. In the IP layer, control information in the form of an IP header 330 is added to the TCP message 320 to create an IP message 340.

In one embodiment of the present invention, the IP header 330 is a class B IP version 4 header, which is fully described in "TCP/IP illustrated, Volume I," supra. Class B IP version 4 headers have a native addressing scheme that includes a 14 bit field and a 16 bit field (also referred to herein as a first and a second IP field, respectively) which are typically used for storing a destination IP network identifier and a destination IP host identifier, respectively. In an embodiment of the present invention, the wireless communication identifier is 14 bits in length and the node identifier is 16 bits in length. Thus, in this embodiment, the hierarchical addressing scheme permits wireless communication system identifiers and node identifiers to be mapped directly into the native addressing scheme of class B IP version 4 headers—that is, mapped to the first and second IP fields in the IP header 330 are the wireless communication system identifier and the node identifier, respectively. In an alternate embodiment of the present invention, the wireless communication identifier and the node identifier are mapped into a first and second field of a IP version 6 header, which has a native addressing scheme that includes fields of different lengths for the storage of node addresses.

TCP headers include a 16 bit field which is typically used for storing a reference label (also referred to herein as a TCP reference field). Protocol stacks use the reference label in the TCP reference field to determine to which software process the corresponding message belongs. If the message belongs to a software process on a component connected via an external bus to the main circuit board, the reference label must indicate the address of the component on which the software process resides. Ideally, the component address can be used as the reference label and be mapped into the TCP reference field. However, in one embodiment of the present invention, the component identifier or address is a bus address associated with the component, and is typically 8–128 bits in length. In such an embodiment, the component address cannot be used as the reference label if it exceeds the 16 bit length limitation of the TCP reference field. One embodiment of the present invention maps server process reference labels into the TCP reference field to indicate a server process that can translate the server process reference labels into addresses of components. Further note that a child server process may be associated with multiple server process reference labels and/or multiple addressable components.

Server process reference labels are reference labels not longer than the length of the TCP reference field, e.g., 16 bits, that identify connections between the protocol stack and specific child server processes. The server process reference label provides two kinds of information. First, the server process reference label indicates to the protocol stack that the corresponding message belongs to a specific child server process. Second, the server process reference label indicates to the child server process the address of the component to which the message is to be routed—that is, the server process reference label is also associated with a component. Note that each addressable component is associated with at least one server process reference label, and each child server process is associated with a server process reference label and an addressable component.

In one embodiment of the present invention, the child server process 218 translates server process reference labels into component addresses using a mapping table 208, wherein the mapping table 208 contains information which correlates server process reference labels to component addresses in the node. In an alternate embodiment of the present invention, the child server process translates server process reference labels into component addresses using a mathematical algorithm 220. Note that in the latter embodiment, the component addresses are typically converted into the server process reference labels by a second mathematical algorithm (which performs a reciprocal function to the first mathematical algorithm).

Referring back to FIG. 3, as the IP message 340 continues down the protocol stack 210, the message is further encapsulated in the AAL layer. In one embodiment, the AAL layer is version 5, i.e., AAL-5, which includes a Common Part Convergence sub-layer (CPCS) and a Segmentation and Re-assembly sub-layer (SAR). In the CPCS sub-layer, control information in the form of an CPCS-PDU trailer 350 is added to the IP message 340 creating a CPCS-PDU message 360. The CPCS-PDU message 360 is then segmented into a series of SAR-PDU packets 370 of a predetermined size, e.g., 48 bytes, in the SAR sub-layer. Subsequently, in the ATM layer, control information in the form of ATM or cell headers 380 are added to create ATM-PDU packets 390. The ATM headers 380 include information (derived from the node address contained in the first and second IP fields) for routing the ATM-PDU packets 390 over the packet switching network 12.

Figure 4:
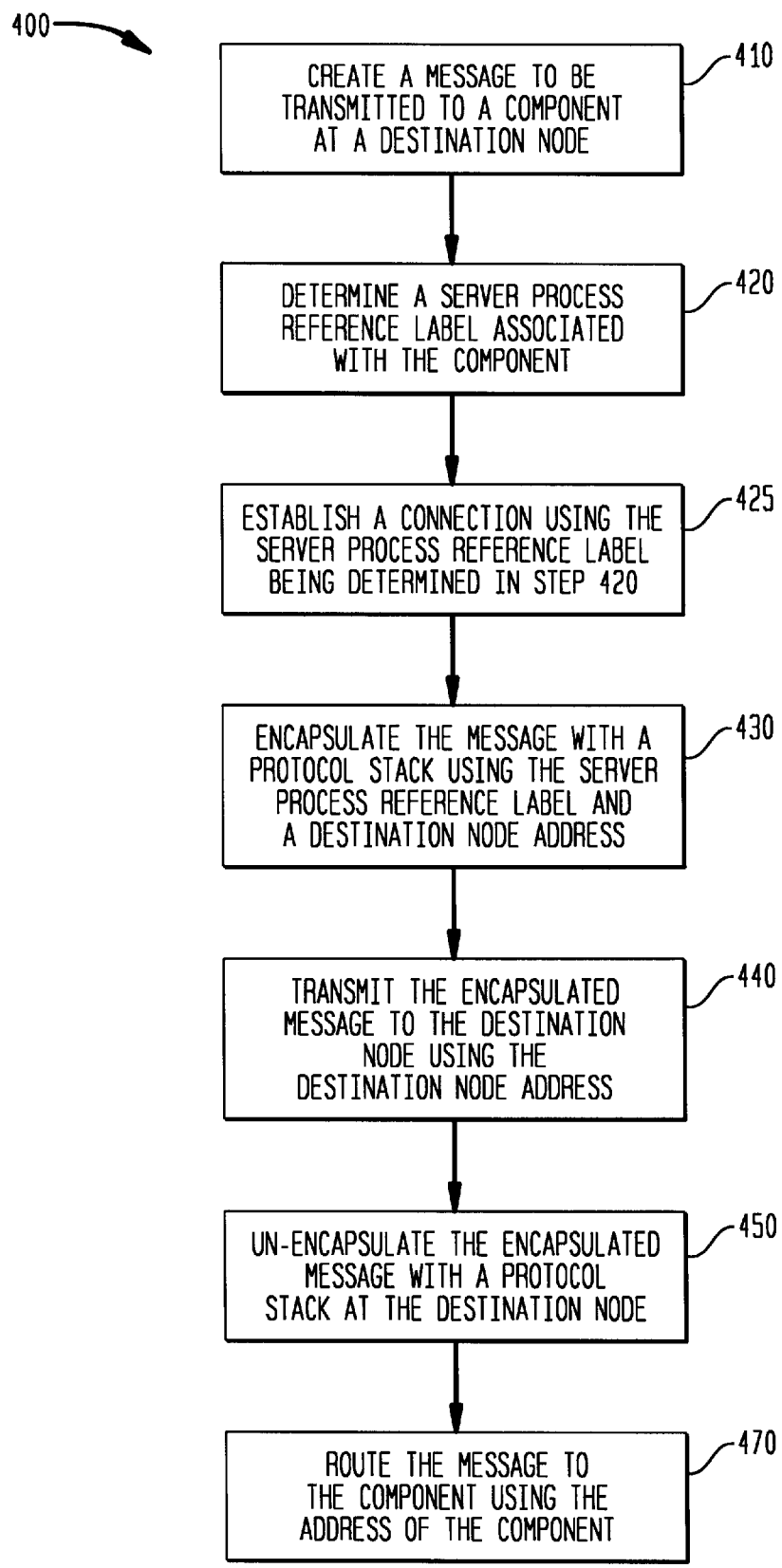
FIG. 4 depicts an exemplary flowchart illustrating the sequence of steps in transmitting messages over the packet switched wireless communication system of FIG. 1 in accordance with one embodiment of the present invention.

Referring to FIG. 4, there is shown an exemplary flow-chart 400 illustrating the sequence of steps in transmitting messages over the wireless communication system in accordance with one embodiment of the present invention. As shown in FIG. 4, the flowchart 400 comprises three main procedures: an initialization procedure (steps 410–425); a node-to-node transmitting procedure (steps 430–440); and a main circuit board-to-component routing procedure (steps 450–470). In step 410, a message to be transmitted to a component in a different or same node is created by a component process or another software process at a source node. Nodes and components to which the message is to be transmitted are referred to herein as destination nodes and destination components, respectively.

In one embodiment of the present invention, the component (or software) process creating the message at the source node knows the addresses of the destination node and the destination component but not the server process reference label associated with the destination component. In step 420, the server process reference label associated with the destination component is determined from the address of the destination component. In an embodiment of the present invention, the goal of step 420 is achieved using a master mapping table. The master mapping table contains information which correlates server process reference labels to addresses of every component in the wireless communication system. By comparison, a mapping table contains information which correlates server process reference labels to addresses of components in a particular node. The master mapping table can be accessed directly by the component process or indirectly by another software process residing in the same node or a different node. Note that if the component process creating the message knows the address of the destination node and the server process reference label associated with the destination component, step 420 can be bypassed.

In step 425, a request for a connection is transmitted to a parent server process at the destination node using the server process reference label determined in step 420. Upon accepting the connection, the parent server process creates a child server process to take over the accepted connection—that is, the child server process will be notified (or be in receipt) of future messages that are associated with the accepted connection, i.e., connection identified by server process reference label determined in step 420. The child server process translates the server process reference label associated with the accepted connection into an address of a component in the destination node using a mapping table, which is a table containing information correlating reference labels to addresses of components in the node. Upon such translation, the child server process knows where to route any messages of which it is notified (or in receipt)—that is, the child server process will route notified or received messages to the component at the translated address. Note that the child server process may also use the master mapping table to perform the translation.

Upon establishing the connection, the message is encapsulated (and segmented) in the source node by the protocol stack 210 (i.e., TCP/IP/AAL/ATM), in step 430, using the address of the destination node and the server process reference label determined in step 420—that is, stored in the first and second IP fields and the TCP reference field are the wireless communication system identifier, the node identifier and the server process reference label, respectively.

In step 440, the encapsulated (and segmented) message, i.e., ATM-PDU packets, is transmitted to the destination node over the packet switching network. In one embodiment of the present invention, the packet switching circuits are assigned the node identifiers—that is, the node addresses identify specific packet switching circuits in specific wireless communication systems. Thus, in this embodiment, the ATM-PDU packets are transmitted over the packet switching network to the packet switching circuit indicated by the control information contained in the ATM headers, i.e., destination node. At the destination node, the ATM-PDU packets are received by the packet switching circuit and temporarily stored in its computer memory.

In step 450, the received encapsulated (and segmented) message is retrieved into the main computer memory of the main circuit board and subsequently un-encapsulated (and re-assembled) by the protocol stack. Specifically, the packet switching circuit transmits an interrupt signal to the CPU via the internal bus to notify the CPU of the presence of an incoming message. The ATM-PDU packets are then retrieved from the computer memory of the packet switching circuit and transferred into a buffer on the main computer memory of the main circuit board where the ATM-PDU packets can be un-encapsulated (and re-assembled) by the protocol stack 210. From the server process reference label contained within the TCP reference field, the protocol stack is able to determine that the message belongs to a specific child server process, i.e., a specific connection. The protocol stack subsequently uses a function to send to the child server process indicated by the server process reference label a notification of the presence of an incoming message.

Upon such notification, in step 470, the child server process routes the message over the external bus 30 to the destination component using the address determined from the server process reference label associated with the accepted connection.

In an alternate embodiment, an address resolution process at the destination node is used to achieve the goal of step 420, i.e., determine the server process reference label associated with the destination component. As shown back in FIG. 2, the address resolution process 212 resides on the main computer memory 40, and is a software process operable to determine a server process reference label from an address of a component.

Referring to FIG. 5, there is shown an exemplary flowchart 500 illustrating the sequence of steps in determining a server process reference label associated with a destination component address in accordance with this embodiment of the present invention. As shown in FIG. 5, in step 510, the component (or software) process at the source node uses an API to create and transmit to the address resolution process at the destination node an address resolution request, which is a message that includes the destination component address. The address resolution request is encapsulated, in step 520, by the protocol stack using the address of the destination node and a resolution reference label that will indicate to the protocol stack the message being received belongs to the address resolution process.

In step 530, the encapsulated address resolution request is sent to the destination node and, in step 540, un-encapsulated by the protocol stack at the destination node. From the resolution reference label, the protocol stack determines that the address resolution request belongs to the address resolution process and transmits a notification or the address resolution request to the address resolution process, in step 550. In step 560, the address resolution process uses a mapping table to determine a server process reference label corresponding to the destination component address contained in the address resolution request. Upon such a determination, some indication of such server process reference label is returned to the source node in step 570. Note that in another embodiment of the present invention, the address resolution request may be in a node other than the destination node.

In an alternate embodiment of the present invention, in step 420, the component process at the source node does not know the address of the destination component and a component allocation process 214, as shown in FIG. 2, is used to determine a component to which the message being created may be transmitted. The component allocation process 214 is a software process operable to select a component in the destination node that is available and/or operable to act upon the message being created by the component process at the source node, to determine a server process reference label associated with such component, and to return such server process reference label to the source node. In this embodiment, a resource request is transmitted from the source node to the component allocation process at the destination node. The resource request is a message asking the component allocation process for a server process reference label associated with an available component. The component allocation process processes the resource request by selecting a component that is available and/or operable to act upon the message and return the server process reference label associated with such component to the source node. Note that in another embodiment, the component allocation process is in a node other than the destination node.

In another embodiment of the present invention, the address (or reference label) of the destination component is embedded in the message (not in the TCP reference field), and the child server process is a software process operable to locate the address embedded within the message and route the message to the destination component using the embedded address. In this embodiment, the address is embedded in the message in a manner permitting the child server process to distinguish the embedded address from other parts of the message. For example, the address is placed within a predetermined location in the message or is preceded by a predetermined set of characters.

Although the present invention has been described in considerable detail with reference to certain embodiments, other versions are possible. Therefore, the spirit and scope of the present invention should not be limited to the description of the embodiments contained herein.

We claim:

1. A method for transmitting messages in a wireless communication system using a server process, wherein the wireless system includes a plurality of inter-connected nodes, the nodes having a main circuit board connected to at least one component by an external bus, the method comprising the steps of:

encapsulating a message to be transmitted to a component in a destination node using a protocol stack, the encapsulated message including an indication of a destination node and a server process reference label, the server process reference label being associated with the component in the destination node;

transmitting the encapsulated message to a main circuit board in the destination node using the indication of the destination node;

un-encapsulating the encapsulated message using another protocol stack at the destination node to obtain the message in the form prior to being encapsulated; and routing the message from the main circuit board to the component using a server process and the server process reference label in the encapsulated message.

2. The method of claim 1, wherein the step of encapsulating the message includes the step of:

creating control information using the server process reference label for indicating to the other protocol stack at the destination node that the message belongs to the server process.

3. The method of claim 1, wherein the step of encapsulating the message includes the step of:

creating control information using the indication of the destination node for transmitting the message to the destination node.

4. The method of claim 3, wherein the step of creating the control information includes the steps of:

inserting a wireless communication system identifier into a field in the control information; and inserting a node identifier into another field in the control information.

5. The method of claim 3, wherein the step of encapsulating the message includes the step of:

creating another control information using the first control information created using the indication of the destination node for transmitting the message over a packet switching network to the destination node.

6. The method of claim 1, wherein the step of routing the message includes the step of:

creating a child server process to route the message from the main circuit board to the component, the child server process being associated with the component and the server process reference label in the encapsulated message.

7. The method of claim 1, wherein the step of encapsulating the message includes the step of:

determining the server process reference label using an address of the component in the destination node and a master mapping table containing information correlating reference labels to addresses of components in the wireless communication system.

8. The method of claim 1, wherein the step of encapsulating the message includes the step of:

determining the server process reference label using an address of the component in the destination node and a mapping table containing information correlating reference labels to addresses of components in the destination node.

9. The method of claim 8, wherein the step of determining the server process reference label includes the step of:

creating a address resolution request associated with a resolution reference label, the address resolution request being a message with the address of the component in the destination node, the resolution reference label being associated with an address resolution process that is operable to determine a server process reference label form an address of a component.

10. The method of claim 1, wherein the step of routing the message includes the step of:

translating the server process reference label in the encapsulated message into the address of the component in the destination node using a mapping table.

11. The method of claim 1, wherein the step of encapsulating the message includes the step of:

determining the server process reference label using an address of the component in the destination node and a mathematical algorithm that converts the address of the component into a server process reference label.

12. The method of claim 1, wherein the step of routing the message includes the step of:

translating the server process reference label in the encapsulated message into the address of the component in the destination node using a mathematical algorithm.

13. The method of claim 1 comprising the additional step of:

determining a server process reference label associated with a component at the destination node available to act upon the message being encapsulated using a component allocation process.

14. A method for transmitting messages to a component in a wireless communication system comprising the steps of:

transmitting a message to a main circuit board in a destination node of the wireless communication system, wherein the message includes an indication of a component address which is embedded in the message such that the indication of the component address is distinguishable from other parts of the message, wherein the indication of the component address indicates to a protocol stack the message belongs to a server process or indicates to a child server process an address of the component where the message is to be routed;

examining the indication of the component address embedded in the message with a server process at the main circuit board in the destination node; and routing the message from the main circuit board to a component associated with the indication of the component address embedded in the message using the server process.

15. The method of claim 14 comprising the additional step of:

creating the message by embedding the indication of the component address in a predetermined location within the message.

16. The method of claim 14 comprising the additional step of:

creating the message by embedding the indication of the component address in a predetermined location from a set of predetermined characters within the message.

17. The method of claim 14, wherein the step of routing the message includes the step of:

determining the address of the component using the indication of the component address embedded in the message.

18. A method for transmitting messages to a component in a wireless communication system comprising the steps of:

transmitting a message to a main circuit board in a destination node of the wireless communication system, wherein the message includes an indication of a component address which is embedded in the message such that the indication of the component address is distinguishable from other parts of the message examining the indication of the component address embedded in the message with a server process at the main circuit board in the destination node; and routing the message from the main circuit board to a component associated with the indication of the component address embedded in the message using the server process, wherein the step of transmitting the message includes the step of:

encapsulating the message using a predetermined reference label which will indicate to the protocol stack in the main circuit board at the destination node that the message belongs to the server process.

19. A wireless communication system comprising:

a packet switching network for switching data from an endpoint in the packet switching network to another endpoint in the packet switching network; and nodes for performing data communication functions, wherein each node includes a packet switching circuit for connecting the node to an endpoint in the packet switching network, a main circuit board having a protocol stack and at least one server process, the protocol stack being operable to encapsulate and segment messages using an indication of a destination node and a server process reference label such that the message may be transmitted from a source node over the packet switching network to the destination node and routed to a component in the destination node, the protocol stack being further operable to un-encapsulate and re-assemble encapsulated and segmented messages, and at least one component connected to the main circuit board via an external bus, the server processes being operable to translate the server process reference label into an address of a component in the destination node and route the message from the main circuit board over the external bus to the component in the destination node.

20. The wireless communication system of claim 19, wherein the server process includes a mapping table containing information correlating server process reference labels to addresses of components in the destination node.

21. The wireless communication system of claim 19, wherein the server process includes a mathematical algorithm for converting server process reference labels into addresses of components in the destination node.

\* \* \* \* \*